United States Patent
Bruemmer et al.

(10) Patent No.: US 6,196,754 B1
(45) Date of Patent: Mar. 6, 2001

(54) DRIVING DEVICE FOR A WINDSHIELD WIPER, ESPECIALLY FOR VEHICLE WINDOW PANES

(75) Inventors: Dietmar Bruemmer, Buehlertal; Juergen Mayer, Gaggenau; Tino Boos, Baden-Baden, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,816
(22) PCT Filed: Oct. 9, 1998
(86) PCT No.: PCT/DE98/02990
§ 371 Date: Aug. 9, 1999
§ 102(e) Date: Aug. 9, 1999
(87) PCT Pub. No.: WO99/20498
PCT Pub. Date: Apr. 29, 1999

(30) Foreign Application Priority Data

Oct. 16, 1997 (DE) .............................................. 197 45 690

(51) Int. Cl.[7] ........................................................ B25G 3/28
(52) U.S. Cl. ........................ 403/279; 403/274; 15/250.3; 15/250.31
(58) Field of Search ..................................... 403/274, 278, 403/282, 284, 279, 334; 15/230.3, 250.31 250.27; 296/96.17

(56) References Cited

U.S. PATENT DOCUMENTS

| | | | |
|---|---|---|---|
| 5,142,939 | * 9/1992 | Bauer et al. | 403/274 |
| 5,176,044 | * 1/1993 | Bauer et al. | 403/274 |
| 5,271,122 | * 12/1993 | Roth et al. | 403/274 |
| 5,372,449 | * 12/1994 | Bauer et al. | 403/274 |
| 5,536,100 | * 7/1996 | Kiefer | 403/274 |
| 5,634,726 | * 6/1997 | Edele et al. | 15/205.3 |

FOREIGN PATENT DOCUMENTS

| | | | |
|---|---|---|---|
| 41 41385 | * | 6/1992 | (DE) . |
| 2 640 213 | * | 6/1990 | (FR) . |
| 2670730 | * | 6/1992 | (FR) . |
| 0704356 | * | 3/1996 | (FR) . |
| 2 198 377 | * | 6/1988 | (GB) . |

* cited by examiner

Primary Examiner—Lynne H. Browne
Assistant Examiner—Tomlyne A. Malcolm
(74) Attorney, Agent, or Firm—Michael J. Striker

(57) ABSTRACT

The invention is directed to a drive device for a wiper installation, in particular for windows in motor vehicles, with a holding element which is arranged so as to be stationary and has, at least on one side, a bearing for receiving a wiper shaft, wherein the bearing is produced as a plastic part and is connected in a positive and frictional engagement with the holding element by means of a partial plastic deformation of the holding element.

It is provided that the bearing (14) has a connection piece (38) engaged by a bushing (40), wherein the holding element (12) engages in an annular space (58) formed between the connection piece (38) and the bushing (40), the holding element (12) is partially plastically deformable inside the annular space (58), and there is a positive engagement (62) between the holding element (12) and the connection piece (38) and a frictional engagement (64) between the holding element (12) and the connection piece (38) and between the holding element (12) and the bushing (40).

7 Claims, 2 Drawing Sheets

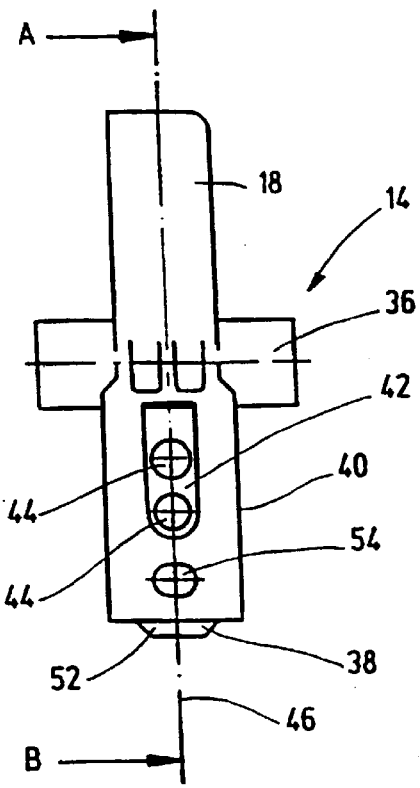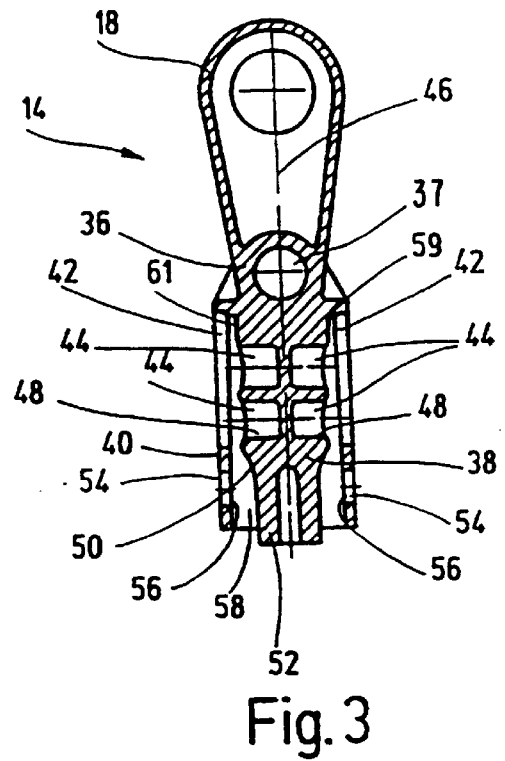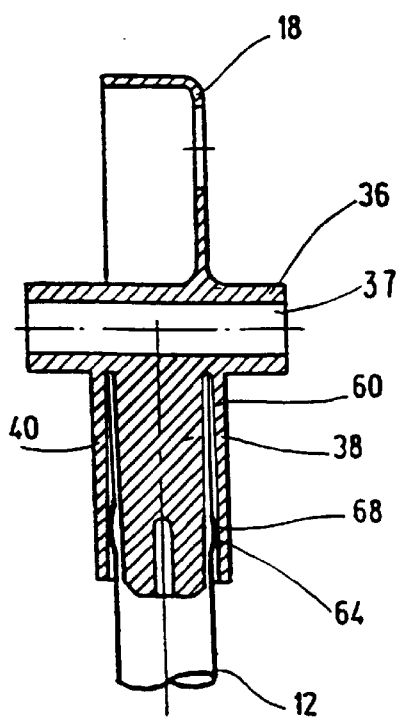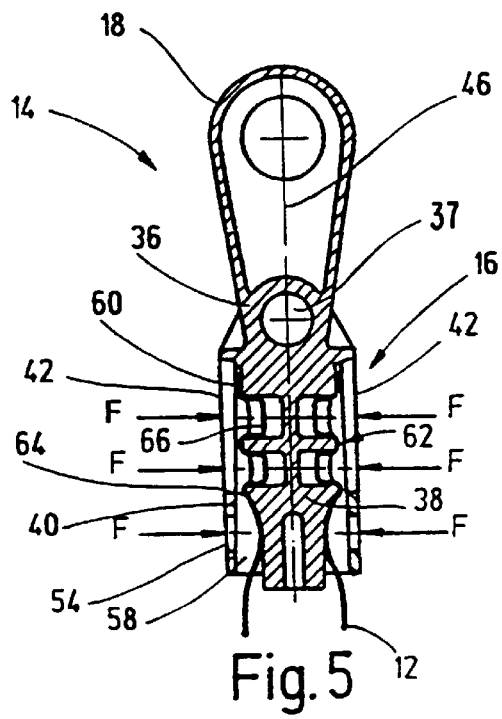
Fig. 2
Fig. 3
Fig. 4
Fig. 5

DRIVING DEVICE FOR A WINDSHIELD WIPER, ESPECIALLY FOR VEHICLE WINDOW PANES

BACKGROUND OF THE INVENTION

The invention is directed to a drive device for a wiper installation, in particular for windows of motor vehicles.

Drive devices of the generic type are known. They have a holding element, generally constructed as a hollow rod, which carries, at its free ends, bearings for receiving a wiper shaft. The bearings are normally produced as diecast parts or as plastic injection-molded parts. In order to connect the bearings with the holding element in a positive and frictional engagement, it is known to construct the bearings with a connection piece which engages in the holding element constructed as a hollow rod. Subsequently, the holding element which is generally a shaped sheet metal part is acted upon by a joining force which results in a plastic deformation of the holding element in some areas. In order to achieve a frictional and positive engagement, the connection piece of the bearing has recesses in the area of the plastic deformation of the holding element, wherein the material of the holding element can be forced into these recesses. It is disadvantageous in the known drive devices that this frictional and positive engagement between the bearing, which is constructed in particular as a plastic part, and the holding element cannot be produced with sufficient security because, due to the modulus of elasticity of the plastic, this plastic tends to flow during the pressing of the joining connection between the bearing and the holding element.

SUMMARY OF THE INVENTION

It is therefore an object of the present invention to provide an actuating device which avoids the disadvantages of the prior art.

In keeping with these objects, one feature of present invention resides, briefly stated, in a drive device for a wiper installation, in which the bearing has a connection piece engaged by a bushing, the holding element engages in an annular space between the connection piece and the bushing and is partially plastically deformable inside the annular space, a positive engagement is provided between the holding element and the connection piece and a frictional engagement is provided between the holding element and the connection piece and between the holding element and the bushing.

In contrast to the prior art, the drive device according to the invention offers the advantage that a secure positive and frictional engagement is produced between the bearing and holding element in a simple manner. As an advantageous result of the fact that the bearing has a connection piece engaged by a bushing, wherein the holding element engages in an annular space formed between the connection piece and the bushing, the holding element is plastically deformable inside the annular space, and a positive engagement exists between the holding element and the connection piece and a frictional engagement exists between the holding element and the connection piece and between the holding element and the bushing, it is achieved that the holding element is essentially clamped in the annular space between the connection piece and the holding element of the bearing due to its plastic deformation. Therefore, added axial and/or radial force acting on the joining connection can be intercepted via the frictional engagement between the bushing and the holding element, so that the bearing is reliably fastened to the holding element. In particular, it is possible to compensate for manufacturing tolerances in a simple manner by the clamping of the holding element between the connection piece and the bushing. Manufacturing tolerances of the bearing, especially its connection piece which can be inserted into the holding element, as well as manufacturing tolerances of the holding element itself, can be compensated by the clamping in the annular space of the bearing between the connection piece and the bushing.

BRIEF DESCRIPTION OF THE DRAWINGS

The invention is explained more fully in the following embodiment example with reference to the accompanying drawings.

FIGS. 2 and 3 show a top view and a longitudinal section of a bearing; and

FIGS. 4 and 5 show longitudinal sections of a connection point between the bearing and holding element rotated in each instance by 90°.

DESCRIPTION OF THE PREFERRED EMBODIMENTS

Figure 1:
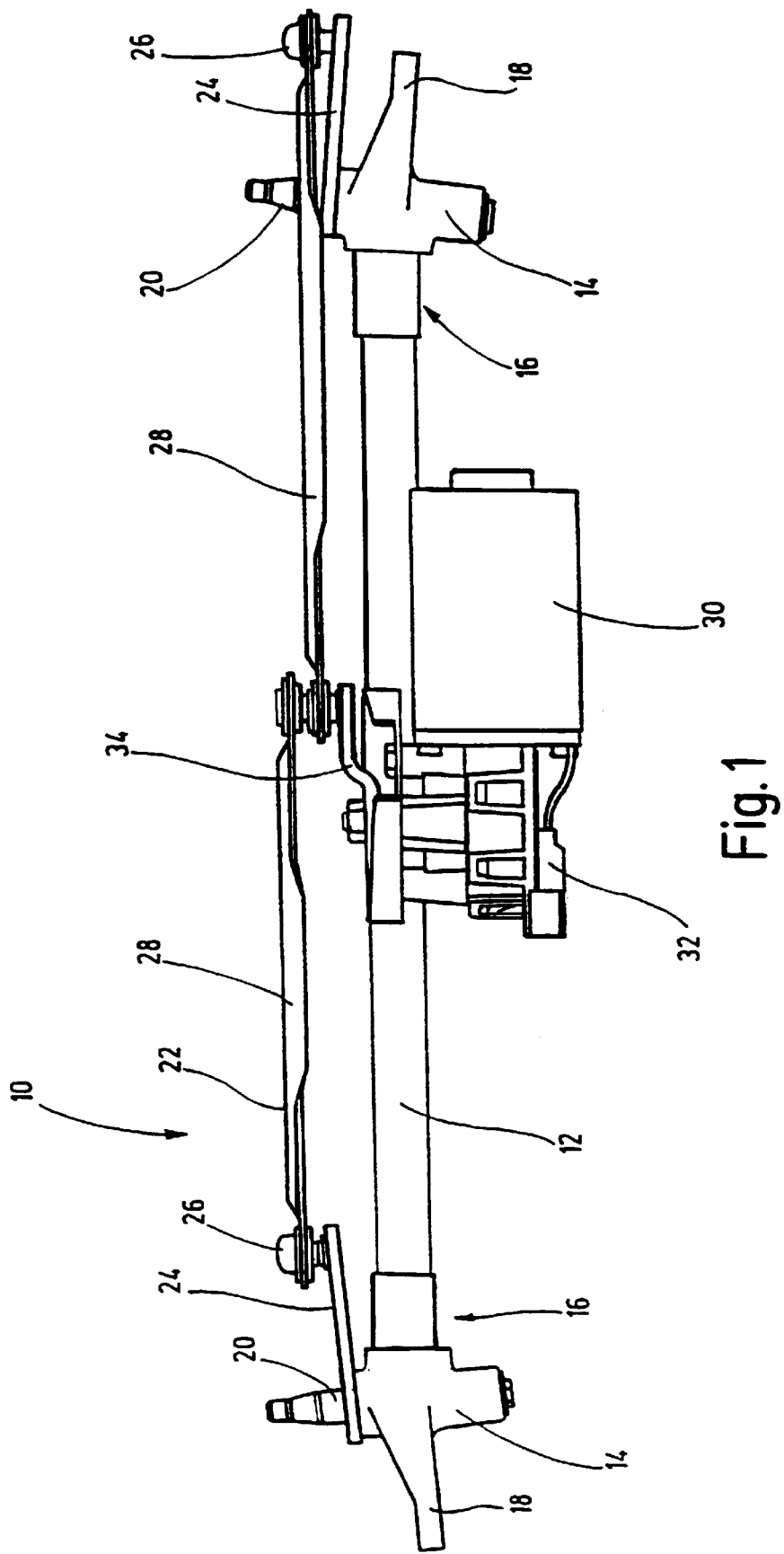
FIG. 1 shows a schematic overview of a drive device for windshield wipers.

FIG. 1 shows an overview of a drive device 10 for windshield wipers in motor vehicles. The drive device 10 has a holding element 12 which is arranged in a stationary manner in a motor vehicle. The holding element 12 has a bearing 14 at both ends. The bearings 14 are joined with the holding element 12 in a fastening area 16 whose specific construction is explained in more detail with reference to FIGS. 2 to 5. At their sides remote of the holding element 12, the bearings 14 are provided with a fastening element 18 having a receptacle for fastening means. The stationary fastening of the drive device 10 to a part of the body of the motor vehicle is carried out by means of the fastening elements 18.

The bearings 14 receive a wiper shaft 20 which is arranged so as to be rotatable but fixed axially. The wiper shaft 20 projects out over the bearing 14, wherein a coupling rod linkage 22 acts at the wiper shaft 20. An arm 24 is connected with the wiper shaft 20 so as to be fixed with respect to rotation relative to it on the one hand and is connected with a coupling rod 28 via a joint 26 on the other hand. A wiper arm which carries a wiper blade in a known manner can be fastened to the free end of the wiper shaft 20 so as to be fixed with respect to rotation relative to it.

The drive device 10 also has a drive motor 30 which drives a crank 34 via a gear unit 32. The crank 34 is connected in an articulated manner with the coupling rods 28.

The functioning of the drive device 10 is known in general, so that a more detailed explanation can be omitted within the framework of the present description. The crank 34 is set in rotation via the drive motor 30. The coupling rods 28 accordingly undergo an axial movement which is oriented essentially along its longitudinal axis. This axial movement is transformed into a swiveling movement via the coupling rods 24 and is transmitted to the wiper shafts 20. The wiper arms which are arranged at the wiper shafts 20 accordingly undergo the known swiveling movement.

The construction of the bearing 14 according to the invention, particularly of the fastening area 16, will be described hereinafter with reference to FIGS. 2 to 5. The bearing 14 comprises a plastic molded part which can be produced as a plastic injection-molded part by known methods in a manner suitable for series production.

The bearing 14 is shown in FIG. 2 in a top view and is shown in FIG. 3 in longitudinal section corresponding to line A-B according to FIG. 2. Parts identical to those in FIG. 1 are provided with the same reference numbers and are not described again. The bearing 14 forms a receptacle 36 for the wiper shaft 20. This receptacle 36 has a through-opening 38 in which the wiper shaft 20 can be arranged so as to be rotatable but so that it can be fixed axially. A connection piece 38, around which a bushing 40 engages, extends in the direction of the holding element 12 (FIG. 1). Both the connection piece 38 and the bushing 40 are constructed in one piece with the other areas and shaped portions of the bearing 14. The bushing 40 has diametrically opposed openings 42 whose axial extension is selected in such a way that pockets 44 introduced in the connection piece 38 lie in the area of the openings 42. The pockets 44 are constructed as depressions 48 arranged radially relative to a longitudinal axis 46 of the bearing 14.

The connection piece 38 passes into a portion 52 of smaller diameter via a conically tapering outer surface 50. A depression 54 is formed in the bushing 40 in the area of the outer surface 50 either as an opening or so as to be bridged by an internal web or crosspiece 56 which serves as a predetermined breaking point in a manner to be explained hereinafter.

It is clear, especially from the sectional view in FIG. 3, that the arrangement of the connection piece 38 and bushing 40 results in an annular space 58 between the connection piece 38 and the bushing 40.

The annular space 58 between the connection piece 38 and the bushing 40 is formed in such a way that a portion 61 of the annular space 58 located in the vicinity of the base 59 corresponds to a material thickness of the holding element 12, so that this holding element 12, in preparation for the joining connection described more fully with reference to FIGS. 4 and 5, can be introduced into the annular space 58 so as to clamp to some extent and is accordingly pre-arranged in position.

FIG. 5 is a sectional view corresponding to FIG. 3 which shows the fastening area 16 between the bearing 14 and holding element 12. The holding element 12 is constructed as a hollow profile, especially as a hollow cylinder, and is guided in the annular space 58 by its end 60. Accordingly, the holding element 12 engages around the connection piece 38 on the one hand and, on the other hand, is itself grasped by the bushing 40. In this position, the holding element 12 is acted upon by a joining force F. For this purpose, dies of a joining device, not shown, reach through the openings 42 and the depression 54. The geometry of the dies is adapted to the cross-sectional surface of the pockets 44 or to the contour of the outer surface 50 taking into account a material thickness of the holding element 12. Due to the application of the joining force F to the holding element 12, a positive engagement 62 and a frictional engagement 64 are formed. The holding element 12 is plastically deformed, so that portions 66 of the holding element 12 are forced into the pockets 44. Due to the positive engagement 62, the bearing 14 is connected with the holding element 12 in such a way that forces acting axial to the longitudinal axis 46 cannot lead to a disengagement of the joining connection between the bearing 14 and the holding element 12. At the same time, the bearing 14 is secured against rotation because the positive engagement 62 acts on the pockets 44 that are formed radially opposite one another. In the areas of the holding element 12 which are rotated by 90° in the view in FIG. 5, the end 60 of the holding element 12 contacts the connection piece 38 essentially parallel as is shown in the view in FIG. 4 which is rotated by 90° with respect to FIG. 5.

In the area of the outer surface 50 which, as is shown in the view in FIG. 4, is likewise formed only at diametrically opposite sides of the connection piece 38, the application of joining force F in this area leads to the deflection of portions 68 of the holding element 12 which extend so as to be rotated essentially by 90° relative thereto. Accordingly, the plastic deformation of the holding element 12 in the direction of the outer surfaces 50 leads, in addition, to a radial outward shaping in portions 68 of the holding element 12. In so doing, the portions 68 come into contact with the bushing 40 and form an additional frictional engagement 64.

Accordingly, as a whole, due to the construction of the bearing 14, especially in that a connection piece 38 is provided, which is engaged by the bushing 40, for forming a positive engagement between the holding element 12 and the connection piece 38 and for forming a frictional engagement between the holding element 12 and the connection piece 38 and, at the same time, between the holding element 12 and the bushing 40, a reliable, lasting joining connection is realized between the holding element 12 and the bearing 14 which safely withstands mechanical loading that occurs during prescribed use of the drive device 10, for example, due to vibrations, and does not become loose. This ensures an exact guidance of the wiper shaft 20 engaging through the bearings 14, so that the latter continues to run smoothly.

Besides the additional frictional engagement 64 between the holding element 12 and the bushing 40, the formation of the annular space 58 also makes it possible to compensate for manufacturing tolerances of the bearing 14, especially its connection piece 38, and of the holding element 12.

According to further embodiment examples, not shown, there is no need for separate construction of depressions 54, for example. For this purpose, the openings 42 are lengthened axially in a corresponding manner so that the plastic deformation of the holding element 12 through the openings 42 can be effected at the outer surfaces 50 of the connection piece 38. According to another variant, the joining force F can be exerted directly on the bushing 40 in the area of the outer surface 50 of the connection piece 38, so that the bushing 40 deforms elastically and the joining force F is applied to the holding element 12 by way of the bushing 40. At the conclusion of the joining process, the bushing 40 returns to its original position because of its elasticity.

What is claimed is:

1. A drive device for a wiper installation for windows in motor vehicles, the drive device comprising a holding element arranged so as to be stationary; a bearing provided at least on one side of said holding element for receiving a wiper shaft, said bearing being formed as a plastic part and connected in a positive and frictional engagement with said holding element by a partial plastic deformation of said holding element, said bearing having a connection piece engaged by a bushing so that an annular space is formed between said connection piece and said bushing, and both said connection piece and said bushing being of one piece with other areas of said bearing, said holding element engaging in said annular space between said connection piece and said bushing and being plastically deformable inside said annular space, said holding element and said connection piece being in a positive engagement with one another, said holding element and said connection piece being in a frictional engagement with one another, and said holding element and said bushing being in a frictional engagement with one another.

2. A drive device for a wiper installation for windows in motor vehicles, the drive device comprising a holding element arranged so as to be stationary; a bearing provided at least on one side of said holding element for receiving a wiper shaft, said bearing being formed as a plastic part and connected in a positive and frictional engagement with said holding element by a partial plastic deformation of said holding element, said bearing having a connection piece engaged by a bushing so that an annular space is formed between said connection piece and said bushing, said holding element engaging in said annular space between said connection piece and said bushing and being plastically deformable inside said annular space, said holding element and said connection piece being in a positive engagement with one another, said holding element and said connection piece being in a frictional engagement with one another, and said holding element and said bushing being in a frictional engagement with one another, said bushing having at least one opening to which are allocated pockets formed in said connection piece, said holding element being actable upon through said opening by adjoining force, so that said holding element can be forced partially into said pockets.

3. A drive device as defined in claim 2, wherein said bushing has, in a diametrically opposite arrangement two openings and corresponding pockets.

4. A drive device for a wiper installation for windows in motor vehicles, the drive device comprising a holding element arranged so as to be stationary; a bearing provided at least on one side of said holding element for receiving a wiper shaft, said bearing being formed as a plastic part and connected in a positive and frictional engagement with said holding element by a partial plastic deformation of said holding element, said bearing having a connection piece engaged by a bushing so that an annular space is formed between said connection piece and said bushing, said holding element engaging in said annular space between said connection piece and said bushing and being plastically deformable inside said annular space, said holding element and said connection piece being in a positive engagement with one another, said holding element and said connection piece being in a frictional engagement with one another, and said holding element and said bushing being in a frictional engagement with one another, said, connection piece having a conically tapering outer surface.

5. A drive device for a wiper installation for windows in motor vehicles, the drive device comprising a holding element arranged so as to be stationary; a bearing provided at least on one side of said holding element for receiving a wiper shaft, said bearing being formed as a plastic part and connected in a positive and frictional engagement with said holding element by a partial plastic deformation of said holding element, said bearing having a connection piece engaged by a bushing so that an annular space is formed between said connection piece and said bushing, said holding element engaging in said annular space between said connection piece and said bushing and being plastically deformable inside said annular space, said holding element and said connection piece being in a positive engagement with one another, said holding element and said connection piece being in a frictional engagement with one another, and said holding element and said bushing being in a frictional engagement with one another, said bushing having a pre-stamped depression in an area of an outer surface.

6. A drive device as defined in claim 5, wherein said outer surface is formed at diametrically opposite portions of said connection piece.

7. A drive device for a wiper installation for windows in motor vehicles, the drive device comprising a holding element arranged so as to be stationary; a bearing provided at least on one side of said holding element for receiving a wiper shaft, said bearing being formed as a plastic part and connected in a positive and frictional engagement with said holding element by a partial plastic deformation of said holding element, said bearing having a connection piece engaged by a bushing so that an annular space is formed between said connection piece and said bushing, said holding element engaging in said annular space between said connection piece and said bushing and being plastically deformable inside said annular space, said holding element and said connection piece being in a positive engagement with one another, said holding element and said connection piece being in a frictional engagement with one another, and said holding element and said bushing being in a frictional engagement with one another, said holding element having an outer surface formed so that an adjoining force can be applied to said holding element in an area of said outer surface, so that a plastic radially inwardly directed deformation of said holding element is effected and portions of said holding element extending at a roughly 900 rotation to said outer surface are deformed radially outwards, so that said portions come into contact with said bushing to form said frictional engagement.

* * * * *